United States Patent Office.

JOHN KINGSLEY PALMER, OF CAMBRIDGE, MASSACHUSETTS.

*Letters Patent No. 96,031, dated October 19, 1869.*

IMPROVED WATER-PROOF COATING OR PAINT FOR WOOD AND OTHER MATERIALS.

The Schedule referred to in these Letters Patent and making part of the same.

*To all whom it may concern:*

Be it known that I, JOHN KINGSLEY PALMER, of Cambridge, in the county of Middlesex, and State of Massachusetts, have invented an Improvement in the Treatment of Gelatine; and I do hereby declare that the following is a description of my invention, sufficient to enable those skilled in the art to practise it.

My invention is based on the discovery that when glue is applied in the form of a size or watery solution, and hot or warm, and with a brush, and mixed with a suitable pigment, and then such glue-coating is covered, by means of a brush, with a solution in water, of bichromate of potash, a paint or coating is obtained which practically resists the action of water and moisture.

For painting buildings, &c., I take about one pound of glue to one gallon of water, and make a solution or "size," with which I mix iron oxides, or other suitable pigments, and apply the mixture, preferably while hot or warm, with a brush, after the manner in which paints and whitewash are applied.

Then, before the coating has parted with much of its moisture, I apply with a brush, a coating of a solution, made by dissolving about one quarter of a pound of bichromate of potash in about a gallon of water.

After said coatings are nearly or fully dried, a second coat of the glue and pigment-wash may be applied, and this is to be covered with the solution of bichromate of potash, as before described.

In practice, it will be found that the coating resulting will resist the action of the elements about as well as ordinary oil-paints, while the cost of the bichromated-glue and pigment coating will be much less than the cost of any oil-paints.

Said coating is peculiarly well adapted for use on rough or unfinished wood-work, and on shingled roofs.

Half a pound of the bichromate of potash may be used with a gallon of water, in which case the glue is more quickly changed by the chemical action of the bichromate, and the excess thereof which does not enter into combination with the glue, will be washed away by rains.

I claim the application of a solution of bichromate of potash to solutions of gelatine, in which pigments are mixed, substantially as and for the purpose described.

JOHN K. PALMER.

Witnesses:
  J. B. CROSBY,
  S. B. KIDDER.